US011757875B2

(12) United States Patent
Sosiade et al.

(10) Patent No.: US 11,757,875 B2
(45) Date of Patent: Sep. 12, 2023

(54) SYSTEM AND METHOD FOR CHECKING DEFAULT CONFIGURATION SETTINGS OF DEVICE ON A NETWORK

(71) Applicant: Johnson Controls Tyco IP Holdings LLP, Milwaukee, WI (US)

(72) Inventors: Silviu G. Sosiade, County Cork (IE); William M. Fitzgerald, Tipperary (IE); Vincent P. Hamilton, County Cork (IE); Miguel I. Morillo, County Cork (IE)

(73) Assignee: JOHNSON CONTROLS TYCO IP HOLDINGS LLP, Milwaukee, WI (US)

(*) Notice: Subject to any disclaimer, the term of this patent is extended or adjusted under 35 U.S.C. 154(b) by 0 days.

(21) Appl. No.: 16/885,895

(22) Filed: May 28, 2020

(65) Prior Publication Data

US 2020/0382499 A1  Dec. 3, 2020

Related U.S. Application Data

(60) Provisional application No. 62/854,143, filed on May 29, 2019.

(51) Int. Cl.
*G06F 7/04*   (2006.01)
*H04L 9/40*   (2022.01)
*H04L 9/32*   (2006.01)

(52) U.S. Cl.
CPC ........ *H04L 63/0876* (2013.01); *H04L 9/3226* (2013.01); *H04L 9/3239* (2013.01); *H04L 63/083* (2013.01)

(58) Field of Classification Search
CPC .......... G06F 21/44; G06F 21/50; G06F 21/64; G06F 21/72; G06F 21/76; G06F 21/565; H04L 63/0876; H04L 9/3226; H04L 9/3239; H04L 64/083; H04L 9/3236
See application file for complete search history.

(56) References Cited

U.S. PATENT DOCUMENTS

| | | | | |
|---|---|---|---|---|
| 6,370,649 B1* | 4/2002 | Angelo | ................... | G06F 21/31 235/382 |
| 7,454,791 B1* | 11/2008 | Godwin | ............... | G06F 21/577 726/25 |
| 7,757,276 B1* | 7/2010 | Lear | ...................... | G06F 21/572 726/6 |
| 9,300,643 B1* | 3/2016 | Doane | ..................... | H04L 63/08 |
| 10,911,438 B2* | 2/2021 | Jin | ........................ | G06F 16/951 |

(Continued)

OTHER PUBLICATIONS

Gauravaram, Security Analysis of Salt||Password Hashes, Nov. 28, 2012, IEEE, pp. 25-30. (Year: 2012).*

(Continued)

*Primary Examiner* — Philip J Chea
*Assistant Examiner* — Jenise E Jackson
(74) *Attorney, Agent, or Firm* — Foley & Lardner LLP

(57) ABSTRACT

A method and system for securely verifying security compliance of a device on a network by generating a hash value for configuration data of the device, sending this value to a compliance service agent, comparing the hash value with hash value of default configuration data of the device, and reporting security non-compliance of the device when the generated hash value is same as the default hash values.

20 Claims, 11 Drawing Sheets

(56) References Cited

U.S. PATENT DOCUMENTS

| | | | | |
|---|---|---|---|---|
| 2002/0184217 | A1* | 12/2002 | Bisbee | G06F 21/41 707/999.009 |
| 2007/0250627 | A1* | 10/2007 | May | H04L 12/66 709/225 |
| 2008/0222428 | A1* | 9/2008 | Dellow | H04L 9/3236 713/193 |
| 2009/0135723 | A1* | 5/2009 | Davidson | H04L 43/103 370/241 |
| 2010/0100721 | A1* | 4/2010 | Su | H04L 9/08 380/278 |
| 2011/0071685 | A1 | 3/2011 | Huneycutt et al. | |
| 2015/0254458 | A1* | 9/2015 | Hong | G06F 21/57 726/22 |
| 2016/0099969 | A1* | 4/2016 | Angus | H04L 9/3268 713/158 |
| 2016/0269405 | A1* | 9/2016 | Suzuki | H04L 63/0876 |
| 2017/0200225 | A1* | 7/2017 | Kanungo | H04L 9/0825 |
| 2018/0006870 | A1* | 1/2018 | McChord | H04L 69/18 |
| 2019/0052615 | A1* | 2/2019 | Auvenshine | H04L 63/083 |
| 2019/0116087 | A1* | 4/2019 | Hiller | H04L 67/12 |
| 2019/0245845 | A1* | 8/2019 | Marinho | H04L 63/0227 |
| 2019/0349426 | A1* | 11/2019 | Smith | H04L 63/123 |
| 2020/0065494 | A1* | 2/2020 | Reich | G06F 21/577 |
| 2020/0099748 | A1* | 3/2020 | Cambridge | H04W 8/22 |
| 2020/0177589 | A1* | 6/2020 | Mangalvedkar | H04L 63/0876 |
| 2020/0230975 | A1* | 7/2020 | Fradet | G06Q 10/087 |
| 2021/0075794 | A1* | 3/2021 | Gazit | H04L 63/102 |
| 2021/0091956 | A1* | 3/2021 | Mullett | G06Q 20/065 |
| 2021/0359897 | A1* | 11/2021 | Shaked | H04L 41/0246 |

OTHER PUBLICATIONS

Khayal et al, Analysis of Password Login Phishing Based Protocols for Security Improvements, Oct. 19, 2009, IEEE, pp. 368-371. (Year: 2009).*

K. Gutzmann et al, Access Control and Session Management in the HTTP Environment, Jan. 2001, IEEE, pp. 26-35. (Year: 2001).*

L. Bosnak et al, What Do Students Do With their Assigned Default Passwords? May 30, 2016, IEEE, pp. 1430-1435. (Year: 2016).*

* cited by examiner

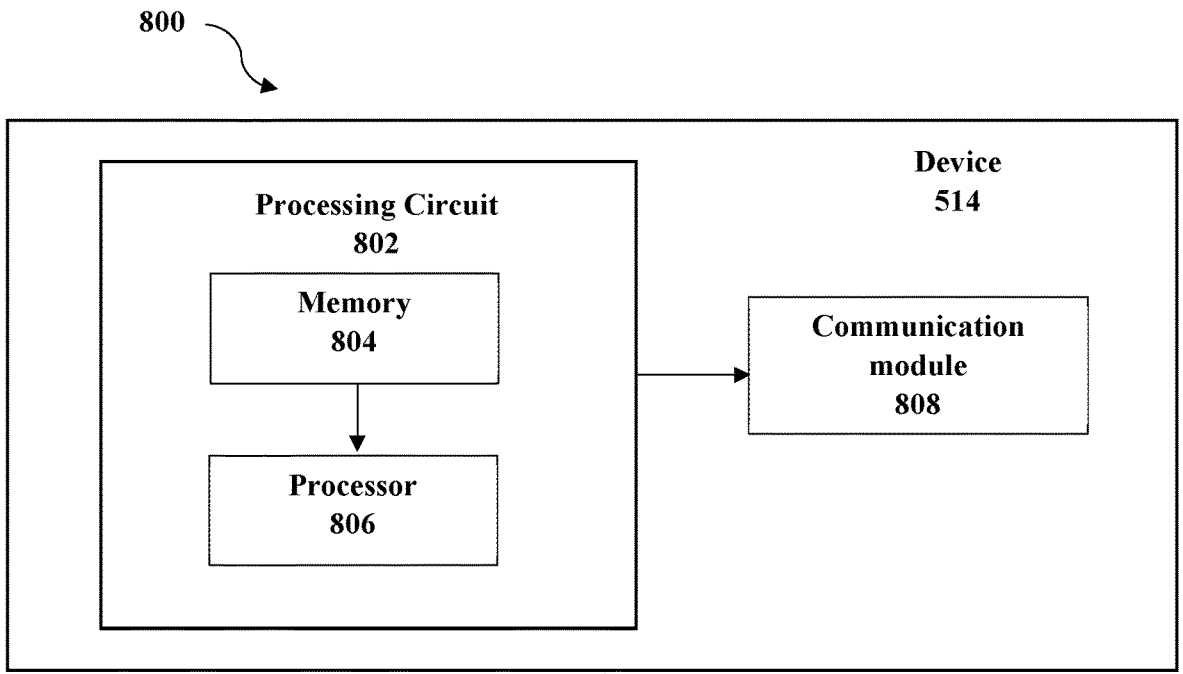
FIG. 8
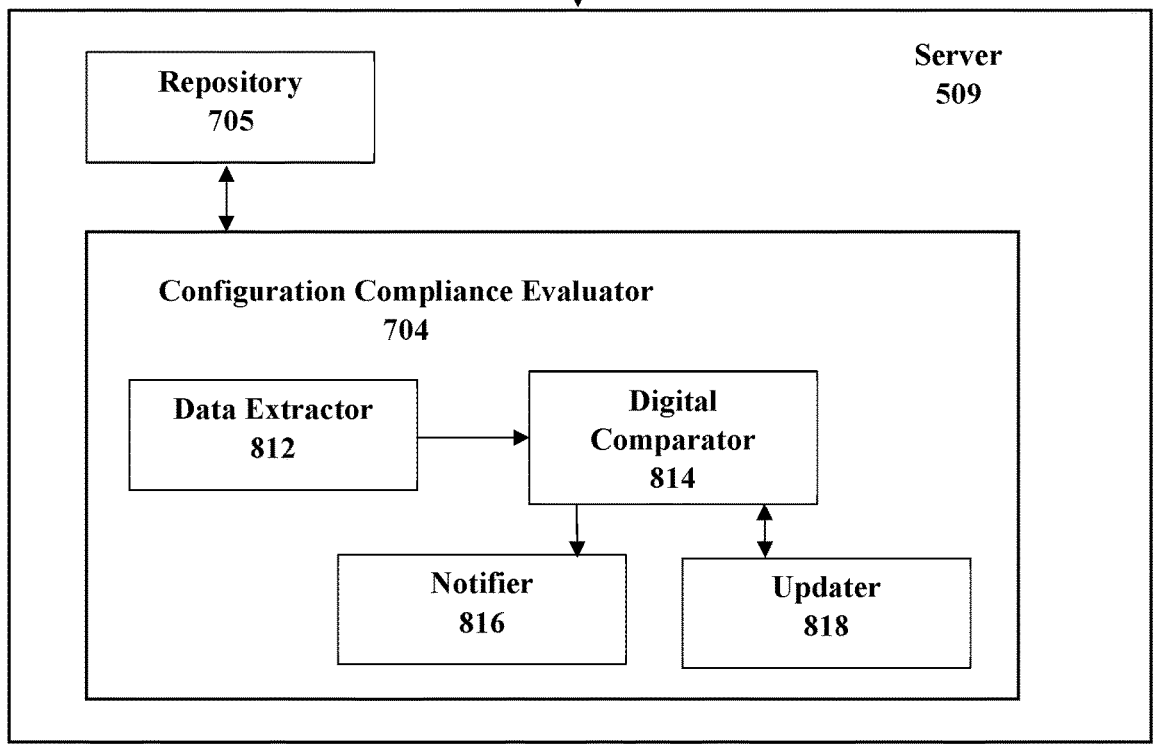

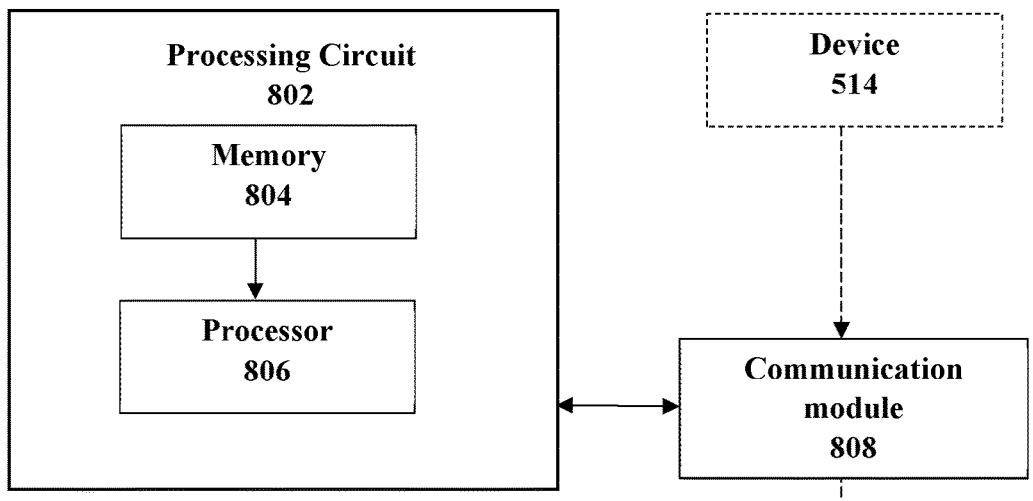
FIG. 9
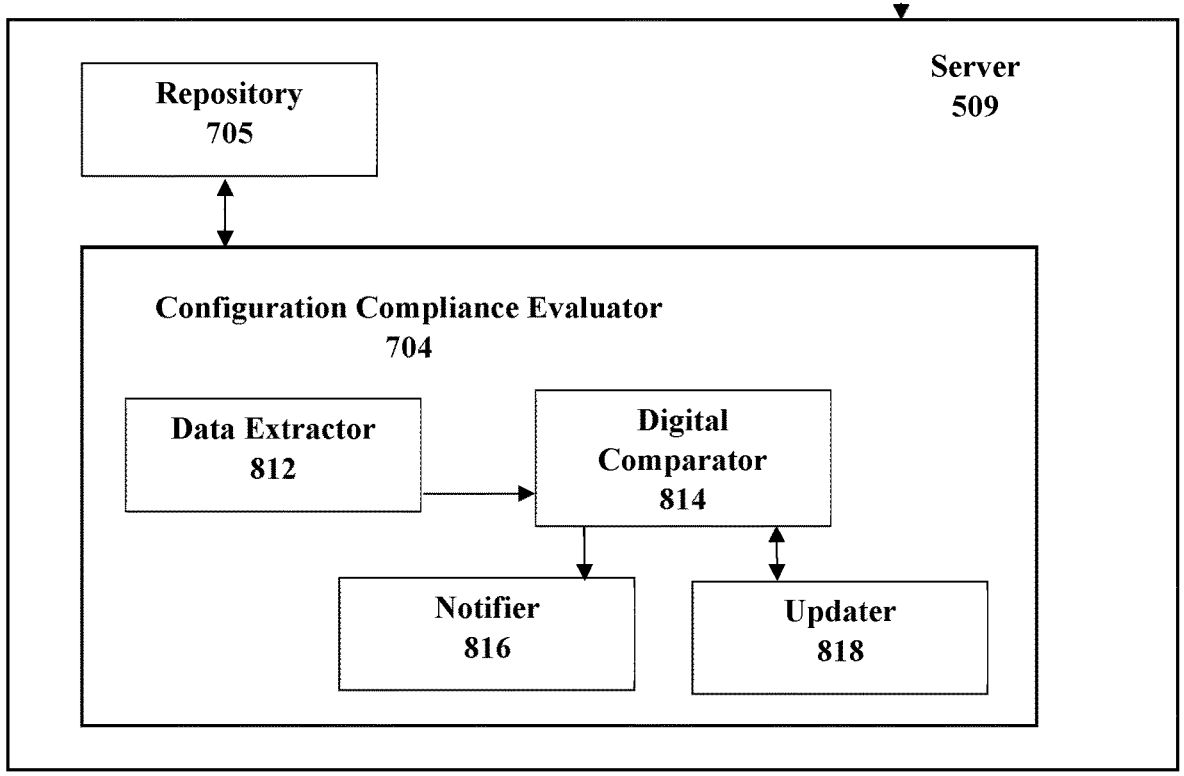

SYSTEM AND METHOD FOR CHECKING DEFAULT CONFIGURATION SETTINGS OF DEVICE ON A NETWORK

CROSS-REFERENCE TO RELATED APPLICATION

The present Application claims the benefit and priority to U.S. Provisional Patent Application No. 62/854,143, filed on May 29, 2019, the entire disclosure of which is incorporated herein by reference.

BACKGROUND

The present disclosure relates generally to computer systems. The present disclosure relates more particularly to the security of devices embedded within the infrastructure of the Internet ("Internet of Things").

IoT covers a wide and expanding range of objects and devices that are connected to the Internet. In particular, building and home automation and management are increasingly IoT-based. IoT is now used widely for home automation or 'smart home' systems, wherein various devices may be connected to a network, including the Internet. Examples of such IoT devices include, routers, connected lighting and plugs, IoT locking systems, home heating systems, fire and security alarm systems, home digital assistants, etc. IoT also applies widely in the automation of industrial processes (often referred to as the Industrial Internet of Things (IIoT)). IoT is extensively used in building management systems. Described below is a building management system featuring equipment and systems connected to networks as one example of a system in which the disclosed idea may be implemented.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., a HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

Currently, there is no secure system and method for checking whether the default IoT product configurations have been changed. Failure to change default configuration settings (including default passwords), represents a large security risk.

SUMMARY

One implementation of the present disclosure is to provide a method for securely verifying security compliance of one or more devices on a network. The method comprises the steps of: generating, a hash value for configuration data of the device, by a processing circuit of the device; receiving, by a server, the generated hash value from the processing circuit; and comparing, by the server, the hash value received from the processing circuit with a pre-determined hash value for the configuration data of the device. Subsequently, the device is determined as security non-compliant when the received hash value is equal to the pre-determined hash value, and is determined as security compliant when the received hash value is different than the pre-determined hash value.

In an embodiment, the step of generating the hash value further comprises: analyzing, the configuration data by employing hash function stored in a memory; and determining, the hash value based on the analysis of each of the configuration data.

In another embodiment, the server is enabled to perform the steps of: determining, the configuration data for which the hash value is received; extracting, the pre-determined hash value corresponding to the determined configuration data of the device from a repository; and utilizing, the pre-determined hash value extracted from the repository for comparison with the hash value received from the processing circuit. Additionally, the server is enabled to perform the steps of generating, a logic high signal when the received hash value is equal to the pre-determined hash value extracted from the repository indicating security non-compliance of the device; and reporting, security non-compliance of the device upon generation of the logic high signal.

In another implementation of the present disclosure, a method for securely verifying security compliance of a device on a network is envisaged. The method comprises the steps of: determining, by a processing circuit, authentication credentials for the device; generating, by the processing circuit, a hash value by performing hash function on authentication credentials; receiving, by a configuration compliance evaluator, the generated hash value from the processing circuit; comparing, by the configuration compliance evaluator, the hash value received from the processing circuit with a pre-determined hash value for default authentication credentials of the device, wherein the device is determined as security non-compliant when the received hash value is equal to the pre-determined hash value, and the device is determined as security compliant when the received hash value is different than the pre-determined hash value.

In an embodiment the method further comprises: generating, a logic low signal when the received hash value and the pre-determined hash value are different; updating, the pre-determined hash value with the received hash value in the repository for the device; and periodically comparing, the received hash value of authentication credentials and the updated pre-determined hash value for the device to determine security non-compliance of the device.

In another implementation of the present disclosure, a system for securely verifying security compliance of a device on a network is envisaged. The system comprises a processing circuit and a server.

The processing circuit is configured to analyze a configuration data of the device by employing hash function, and is further configured to determine a hash value for the analyzed configuration data. The server is communicatively coupled with the processing circuit to receive the hash value, and the server comprises a repository and a configuration compliance evaluator. The repository is configured to store a pre-determined hash value for one or more configuration data of the device. The configuration compliance evaluator is configured to compare the received hash value with the pre-determined hash value, wherein the device is determined as security non-compliant when the received hash value is equal to the pre-determined hash value, and the device is determined as security compliant when the received hash value is different than the pre-determined hash value.

In an embodiment, the configuration data is a password, and the generated hash value corresponds to present password whereas the pre-determined hash value corresponds to default password.

Still further, the configuration data is selected from the group consisting of the status of Secure Socket Shell (SSH), the status of Telnet, port data, password, and firmware version.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 8 is a block diagram of a system for securely verifying security compliance of a device on a network, in accordance with one embodiment of the present disclosure.

FIG. 9 is a block diagram of a system for securely verifying security compliance of a device on a network, in accordance with another embodiment of the present disclosure.

DETAILED DESCRIPTION

Building and Building Management System

Figure 1:
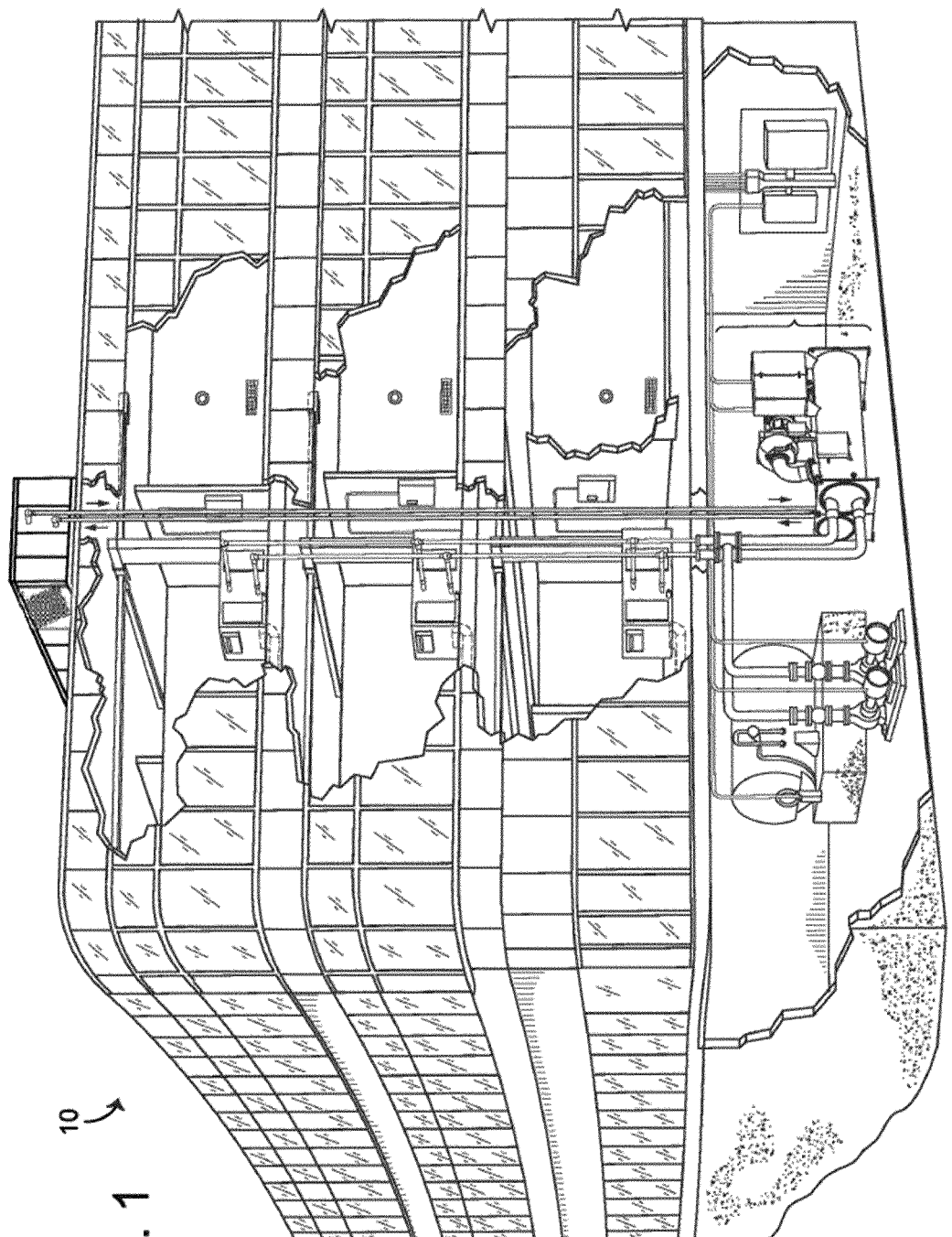
FIG. 1 is a drawing of a building equipped with a building management system (BMS), according to some embodiments.

Referring now to FIG. 1, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
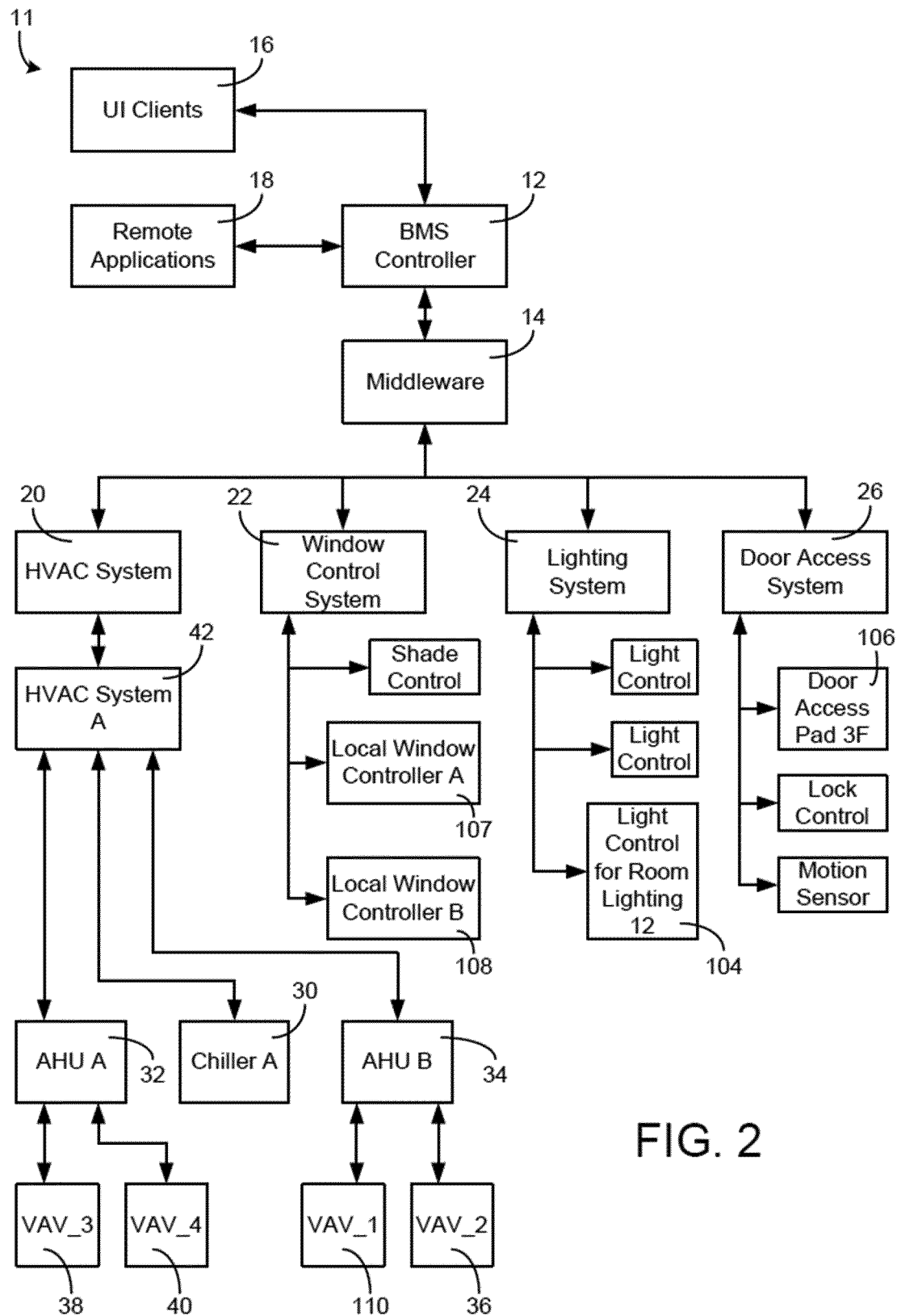
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may be integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
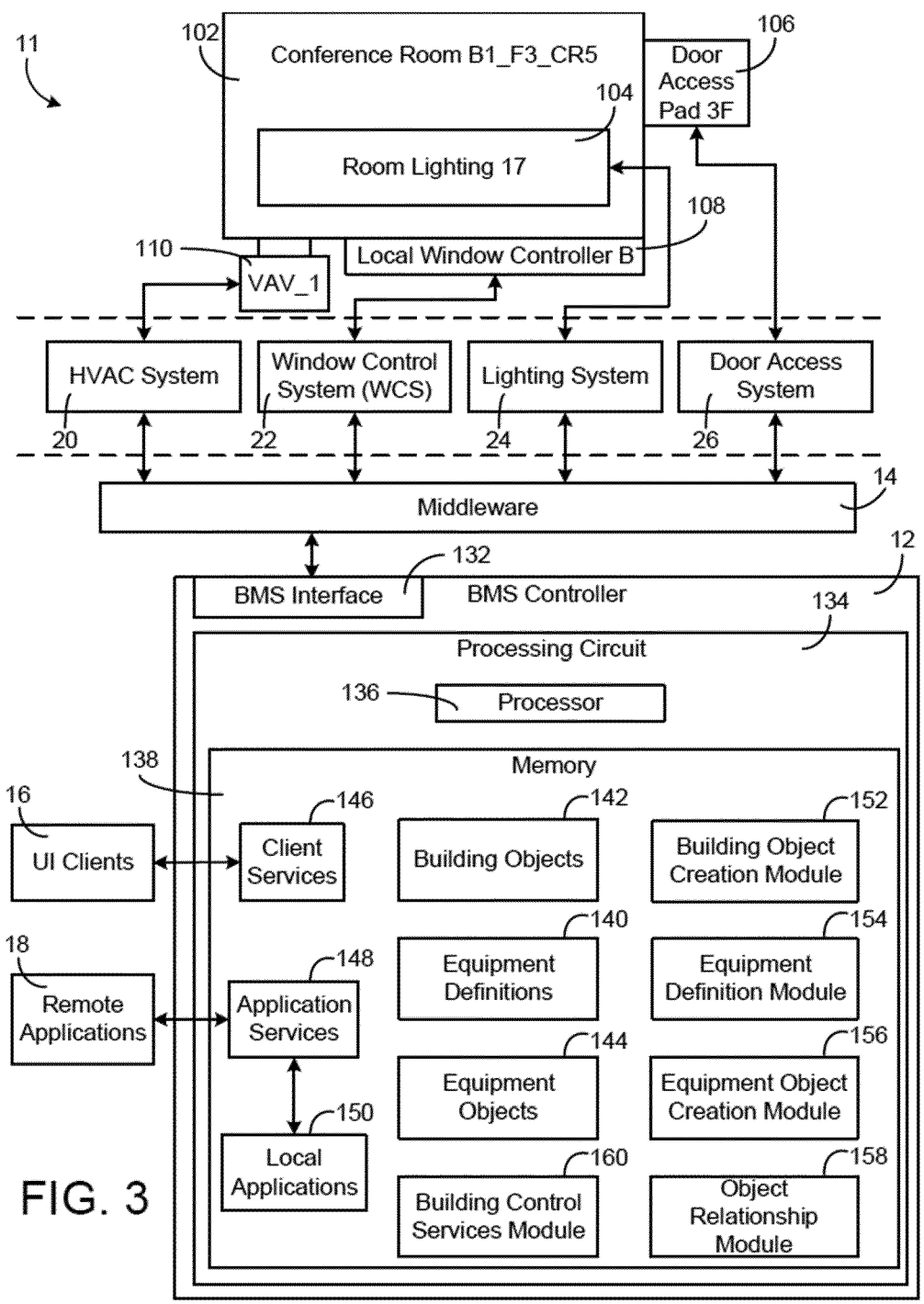
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, a NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure.

Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20.SUP-FLOW" (i.e., the supply air flow rate through VMA-20). Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA- 20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18.SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
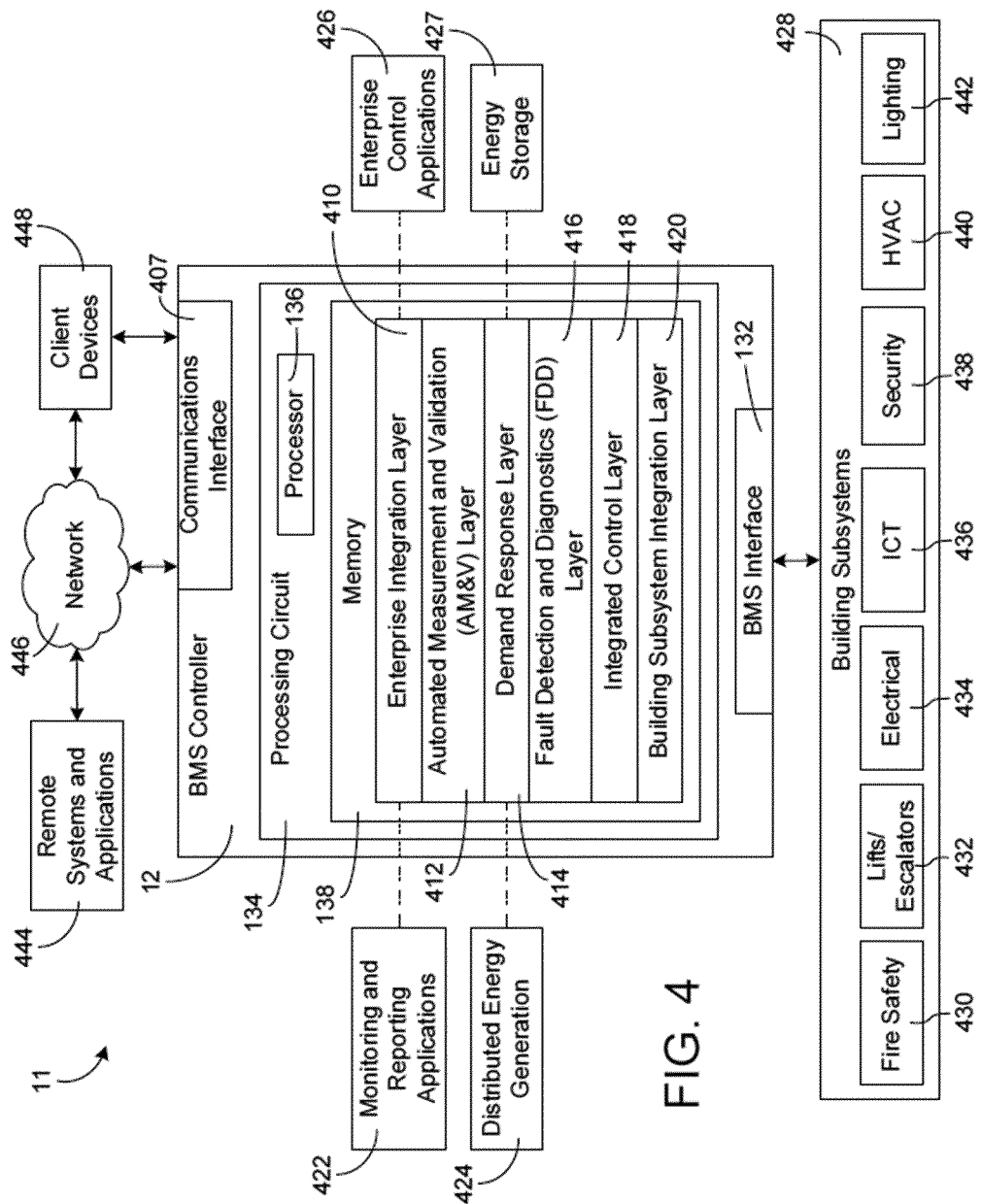
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

System and Method for Checking the Default Configuration Settings of a Device on a Network Referring now to FIG. 5 through FIG. 11, systems and methods for checking the default configuration settings of a device on a network is envisaged.

The system of the present disclosure is enabled to check a network of devices on a network for security compliance with respect to changing the device default configuration. The envisaged system employs a mechanism for checking whether a default configuration of the device has been altered, without compromising the security of the current device configuration to the network. For example, one key configuration is the default password. The disclosed invention supports the checking of device passwords across a network, without exposing those passwords.

The invention uses a hashing function to encode the configuration data. This data is then broadcast or transmitted across the network, possibly as part of a heartbeat message. A custom service analyzes this message and compares the hashed configuration results against a pre-computed hash result that was computed with the device's default configuration. A match indicates that the device's default configuration has not been updated and a security risk is flagged.

Figure 5:
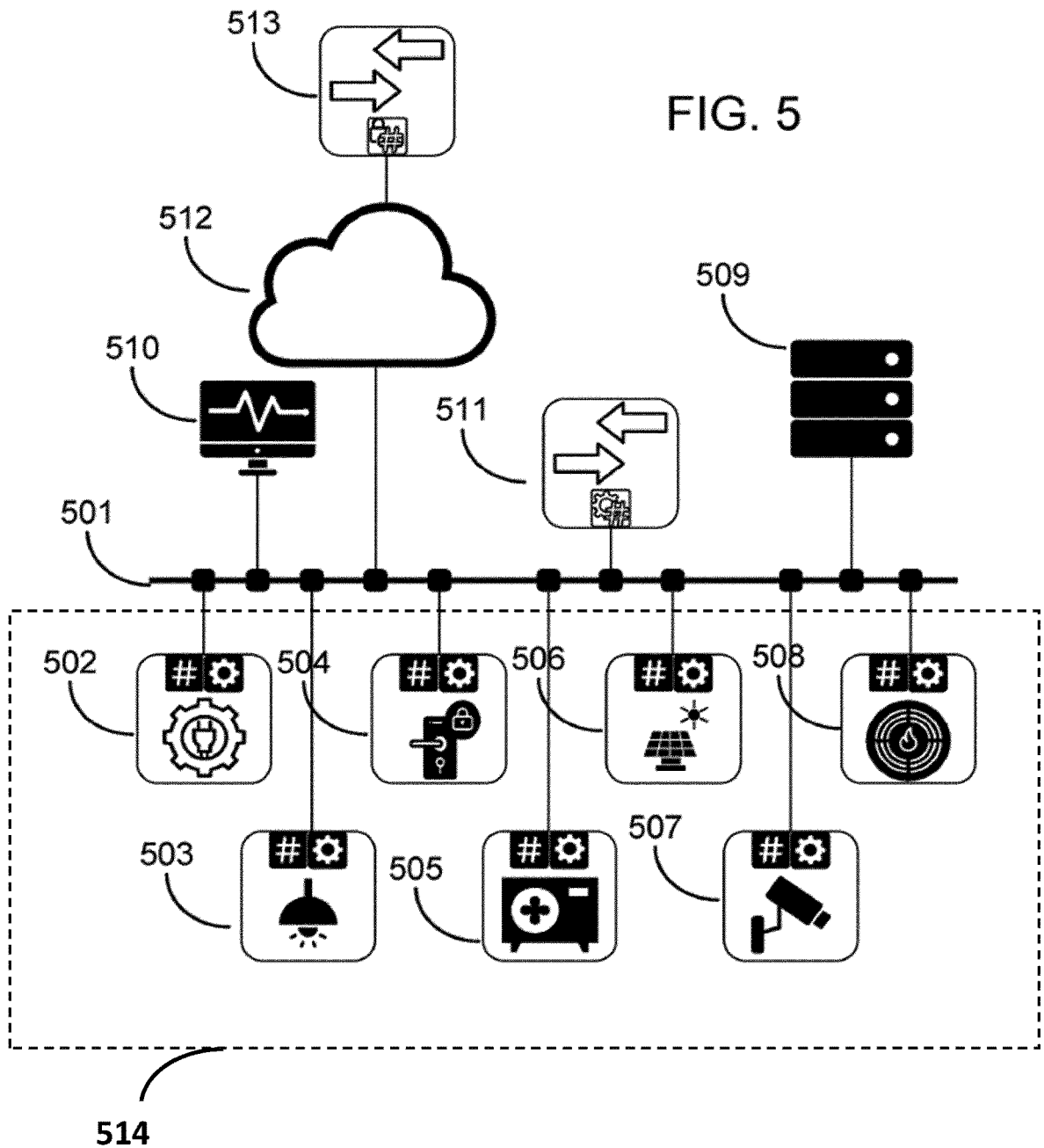
FIG. 5 is a block diagram of a network of IoT devices in which the disclosed idea may be implemented, according to some embodiments.

Referring now to FIG. 5, one application of the invention is described. The invention is implemented as a service on an IP network 501 that supports IoT devices such as power management device 502, lighting management device 503, physical security device 504, heating and ventilation device 505, solar energy management device 506, security camera device 507, fire and life safety monitoring device 508, or any other IoT enabled or network-enabled devices. Attached to the network is a management server 509 and a monitor 510. The secure configuration compliance service, can reside on the same local network 511 or on an external network 512, 513 that has been granted access to the local network.

The process is described below using the following role definitions:

A "client system" is a device or a software program that requires certain default configuration changes upon installation and commissioning.

A "configuration compliance service" or "configuration compliance evaluator" is a piece of software that resides outside of the physical enclosure where the "client system" is deployed and has the ability to verify whether or not certain parts of the device configuration data are changed. Such a service may reside either on a service provider backend infrastructure or on a customer premises (or on both). In one implementation the configuration compliance evaluator is implemented within a server of the same network 511. In another implementation, the configuration compliance evaluator is implemented within a server or a computing device of a secondary network (512, 513).

A "default hashing repository" or "repository" is centralized and secure storage of hashes matching parts of the default configuration data that are subject to verification and enforcement. The role of this entity is to assist the configuration compliance service in implementing the verification procedure. When a particular client system is manufactured or commissioned, this repository is updated to contain the hashes for the default configuration pertaining to that product.

Figure 7:
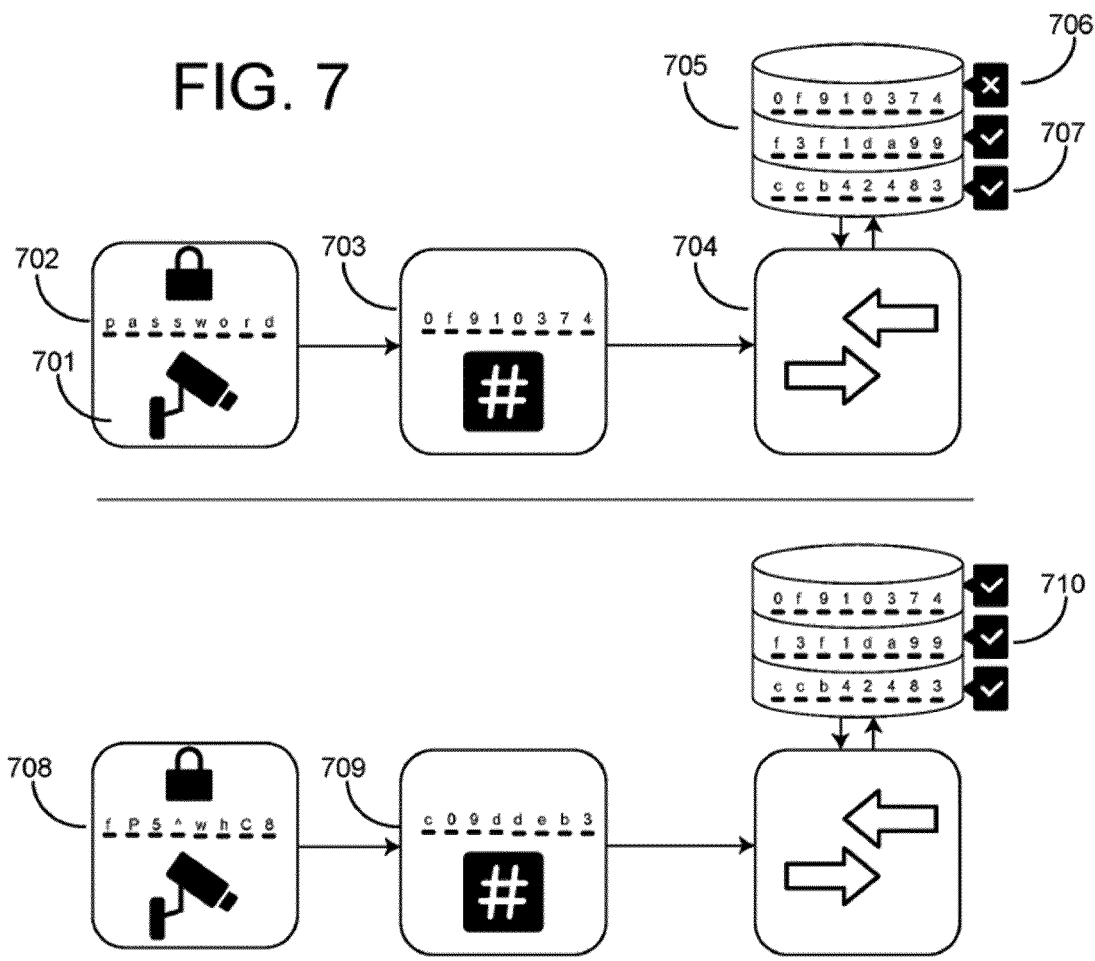
FIG. 7 is a block diagram illustrating the disclosed method, according to some embodiments.

Referring now to FIG. 7, a simplified illustration of an exemplary embodiment of the envisaged system is shown. The example shows an IP-connected security camera 701. The camera's password 702 is encoded with a hash function 703. The configuration compliance service 704 (hereinafter also referred as "configuration compliance evaluator") checks the default hashing repository 705 to match the password. Matched values 706 represent security risks. Unmatched values are passed 707. The password values used in 708 are also encoded 709, however, because the values have been changed from the default, the default hashing repository does not contain any matches 710 and the device is termed as security compliant.

Figure 10:
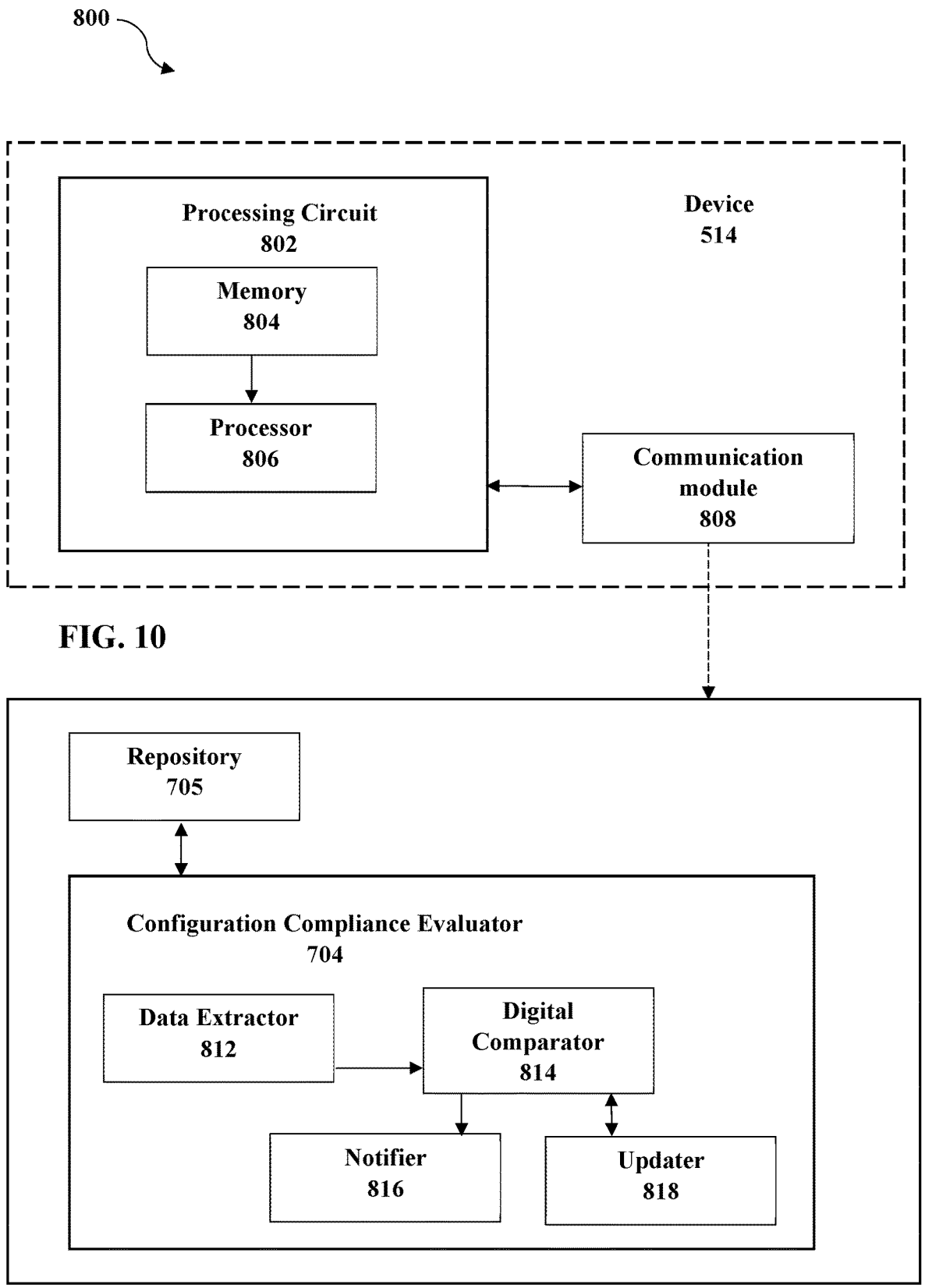
FIG. 10 is a block diagram of a system for securely verifying security compliance of a device on a network, in accordance with yet another embodiment of the present disclosure.

Referring to FIGS. 8, 9 and 10, a system 800 for securely verifying the security compliance of a device 514 on a network 501 is disclosed. In an embodiment, the device 514 refers to at least one of power management device 502, lighting management device 503, physical security device 504, heating and ventilation device 505, solar energy management device 506, security camera device 507, fire and life safety monitoring device 508, edge device, or any other IoT enabled or network-enabled devices.

The system 800 comprises a processing circuit 802 and a server 509. The processing circuit 802 is affiliated with the device 514, and is enabled to analyze at least one configuration data of the device 514 by employing hash function, wherein the device 514 is deployed in the network 501. In one implementation, the processing circuit 802 is implemented using the electronic circuit of the device 514, and is therefore integral. In another implementation, the processing circuit 802 is affiliated with the device 514, and is either detachably mounted on the device 514 or is housed within the enclosure of the device 514. Further, the processing circuit 802 is configured to determine a hash value for the analyzed configuration data. A communication module 808, of the device 514, is enabled to either broadcast or transmit the generated hash value, wherein the communication module 808 is enabled to transmit the generated hash value by employing a wireless communication protocol or via a wired communication.

In one embodiment, the processing circuit 802 comprises a memory 804 and a processor 806. The memory 804 is enabled to store the hash function to be utilized for generating the hash value. The hash function corresponds to one of the standard cryptographic hash function including, but not limited to, SHA-2, SHA-3, MD5, and BLAKE2. The processor 806 is communicatively coupled to the memory 804, and is configured to analyze the configuration data by employing the hash function. Further, the processor 806 is configured to determine the hash value for the analyzed configuration data. In one embodiment, the processor 806 is enabled to generate multiple one hash values wherein each hash value corresponds to one configuration data.

In some embodiment, the generated hash value is transmitted as part of a message, wherein the message is a heartbeat message.

The server 509 is communicatively coupled with the processing circuit 802 via the communication module 808, and is enabled to receive the message containing the hash value from the processing circuit 802. The server 509 comprises a repository 705 and a configuration compliance evaluator 704.

The repository 705 is configured to store a pre-determined hash value for one or more configuration data of the device 514. In an embodiment, the repository 705 comprises a list of devices (502-508) in the network 501, and one or more configuration data and pre-determined hash value for each of the configuration data corresponding to each of the listed devices.

In some embodiment, the configuration compliance evaluator 704 includes a data extractor 812, a digital comparator 814, a notifier 816, and an updater 818. Subsequent to reception of the message containing the hash value for the configuration data, the data extractor 812 is enabled to determine the configuration data for which the hash value is received from the processing circuit 802, and further extract the pre-determined hash value from the repository 705, wherein the extracted pre-determined hash value corresponds to the determined configuration data which is default configuration data.

The digital comparator 814 is communicatively coupled with the data extractor 812 to receive the pre-determined hash value. The digital comparator 814 is configured to compare the hash value received from the processing circuit 802 with the pre-determined hash value extracted from the repository. Specifically, the device 514 being verified is determined as security non-compliant when the received hash value is equal to the pre-determined hash value. Alternatively, the device 514 is determined as security compliant when the received hash value is different from the pre-determined hash value.

In one embodiment, the digital comparator 814 is configured to generate a logic high signal when the received hash value is equal to the pre-determined hash value. The notifier 816 is configured to receive the logic high signal from the digital comparator 814, and is enabled to generate a flag signal reporting security non-compliance of the device 514. Typically, the user is visually notified, based on the flag signal generated by the notifier 816, by means of the monitor 510. In some embodiments, the flag signal comprises the details of the device 514 being identified as security non-compliant, and the monitor 510, based on the received flag signal, displays the details of the device being non-compliant thereby issuing an alert and need of taking appropriate actions.

In another embodiment, the digital comparator 814 is enabled to generate a logic low signal when the received hash value and the pre-determined hash value are different. The updater 818, of the server 509, is enabled to receive the logic low signal from the digital comparator 814. Upon receiving the logic low signal, the updater 818 updates the pre-determined hash value for configuration data of the device 514 in question with the hash value received from the processing circuit 802. Further, the digital comparator 814 is enabled to periodically evaluate the security compliance of the device 514 by comparing the received hash value against the updated pre-determined hash value.

In a preferred embodiment, the configuration data is password, and the pre-determined hash value stored in the repository 705 corresponds to default configuration data of the device under question, wherein the default configuration data is default password applied by the manufacturer during manufacturing or installation of the device. In one embodiment, the repository 705 may be a remote database or cloud storage.

Yet another embodiment of this disclosure may include enforcement of good password policies by including a list of known bad passwords in the hashing repository.

In ambit of the present disclosure, it is to be understood that the processing circuit 802 is implemented as part of the device 514 or it as a separate electronic circuit configured to perform the desired task, however is affiliated to the device 514. Additionally, referring to FIGS. 8 and 9, the configuration compliance evaluator 810 can be implemented within the server 509 or else as depicted in FIG. 10, the configuration compliance evaluator 810 can be separately implemented using one or more processor(s).

In one embodiment, the server 509 is associated either with the network 511 having the device 514 being verified for security compliance or with a different network (512, 513).

Figure 6:
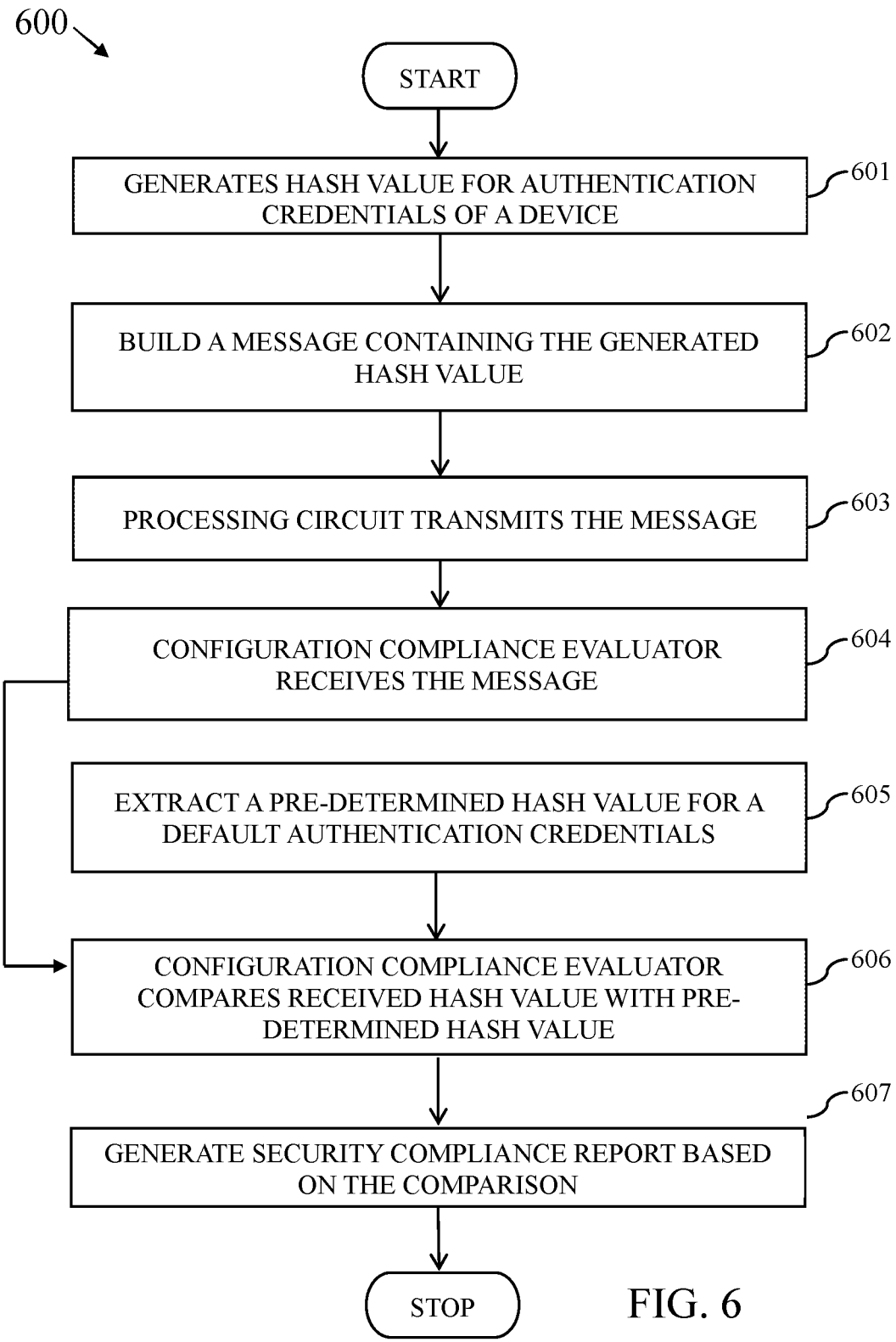
FIG. 6 is a process flow diagram describing the method for securely verifying security compliance of a device on a network, according to some embodiments.

Referring now to FIG. 6, a method 600 for verifying security compliance of a device 514 on a network is envisaged, in accordance with an implementation of the present disclosure. The processing circuit 802, affiliated with the device 514, is enabled to determine the authentication credentials for the device 514, and subsequently generate a hash value by performing hash function on the determined authentication credentials. Further, the method 600 comprises the steps being performed by a configuration compliance evaluator 704, which includes: receiving, the generated hash value from the processing circuit 802; and comparing the hash value received from the processing circuit 802 with a pre-determined hash value corresponding to default authentication credentials of the device 514. Specifically, the device 514 is classified as security non-compliant when the received hash value is equal to the pre-determined hash value, and the device 514 is classified as security compliant when the received hash value is different than the pre-determined hash value.

The method 600, at step 601, depicts generating, by the processing circuit 802 affiliated with the device 514 being verified for security compliance, the hash value for authentication credentials of the device. In an embodiment, the authentication credentials refer to password which is at present being utilized for accessing the device. In an alternative embodiment, the authentication credentials can be either user ID or combination of User ID and password. In another embodiment, the processing circuit 802 employs hash function stored within a memory 804 to generate the hash value. Further, at step 602, the processing circuit 802 is enabled to embed the generated hash value for the authentication credential within a message. In an embodiment, the message is a heartbeat message. Still further, at step 603, the processing circuit transmits the message containing the hash value. In an embodiment, the processing circuit is enabled to broadcast the message containing the hash value over the network 501.

At step 604, a configuration compliance evaluator 704 may be enabled to receive the message containing the hash value transmitted by the processing circuit 802. The processing circuit 802, at step 605, is configured to extract a pre-determined hash value for a default authentication credentials of the devices in the network 501. The repository 705 is enabled to store pre-determined hash value for one or more default authentication credentials. In one embodiment, the repository 705 may correspond to an internal storage of the server 509 enabling the implementation of the configuration compliance evaluator 704. In an embodiment, the configuration compliance evaluator 704 may be implemented using one or more processors of the server 509. In another embodiment, the configuration compliance evaluator 704 may be installed as a firmware within the server 509. Still further, at step 606, the configuration compliance evaluator 704 is configured to compare the received hash value with the pre-determined hash value to determine the security compliance of the device 514. Specifically, the configuration compliance evaluator 704 determines the device 514 as security compliant when the received hash value and the pre-determined hash value are different. Alternatively, the configuration compliance evaluator 704 determines the device as security non-compliant when the received hash value and the pre-determined hash value are same or equal.

In one embodiment, the message containing the generated hash value is transmitted periodically or in response to a request received from the server 509 or the configuration compliance evaluator 704.

At step 607, the configuration compliance evaluator 704 generates a report or notification summarizing the compliance status of each device on the network. In an embodiment, the configuration compliance evaluator 704 is configured to generate a logic high signal when the received hash value is equal to the pre-determined hash value, and subsequently upon generation of the logic high signal the configuration compliance evaluator reports security non-compliance of the device.

In accordance with an embodiment of the present disclosure, the configuration compliance evaluator 704 is enabled to perform the steps of: extracting the pre-determined hash value for the device from the repository 705; and utilizing, the pre-determined hash value extracted from the repository for comparison with the hash value received from the processing circuit 802.

In accordance with another embodiment of the present disclosure, the method includes the further steps of: generating, a logic low signal when the received hash value and the pre-determined hash value are different; updating, the pre-determined hash value with the received hash value in the repository 705 for the device upon generation of the logic low signal; and periodically compare, the received hash value of authentication credentials and the updated pre-determined hash value for the device to determine security non-compliance of the device 514. The configuration compliance evaluator 704 may comprise an updater 818 to perform the step of updating the received hash value in the repository 705.

Figure 11:
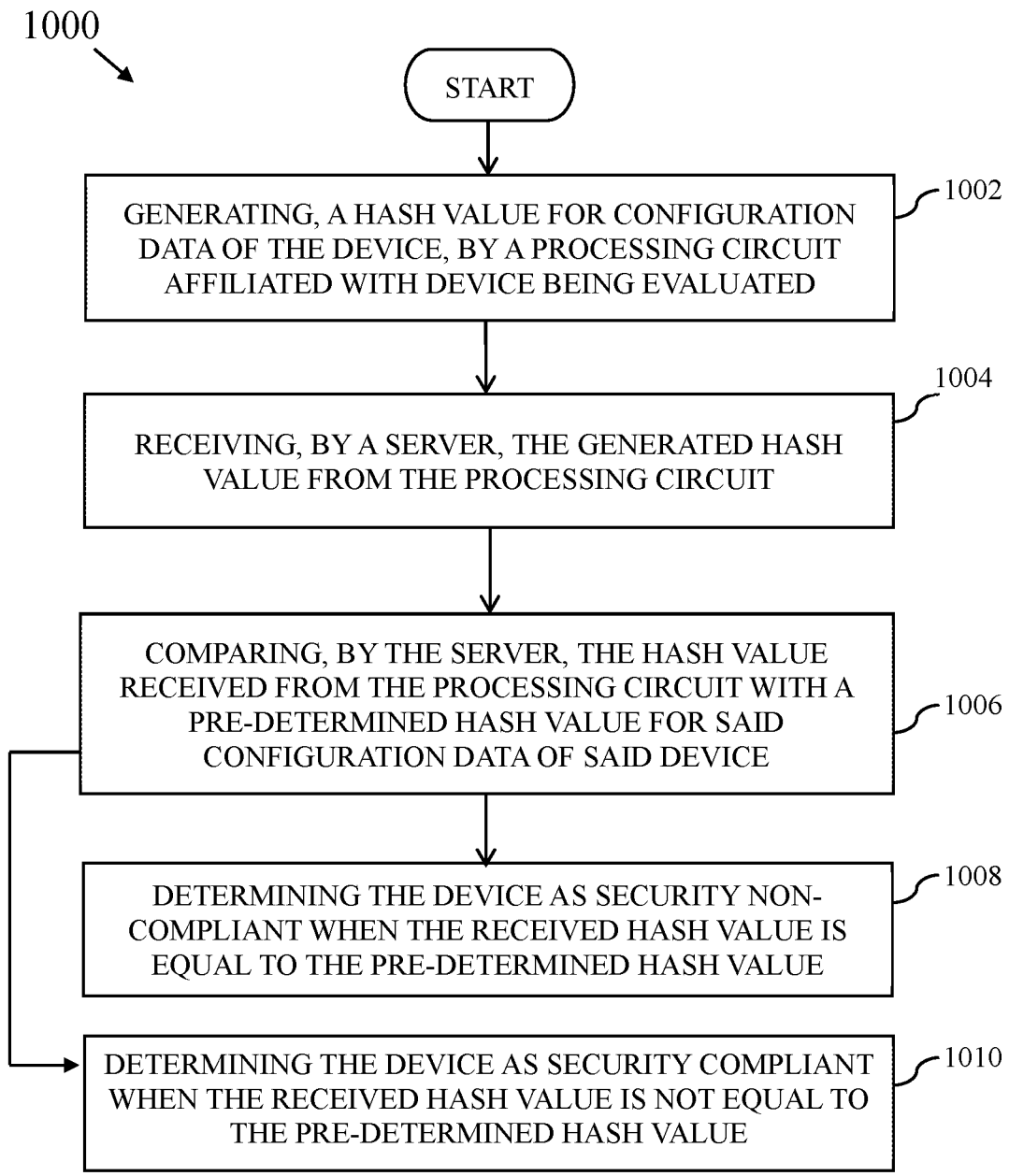
FIG. 11 is a process flow diagram describing the method for securely verifying security compliance of a device on a network, according to another implementation of the present disclosure.

Referring to FIG. 11, in another implementation, a method 1000 is envisaged depicting the steps being performed to determine the security compliance of a device in a network.

At step, 1002, the device is enabled to generate a hash value for one of the configuration data. Specifically, the processing circuit 802 affiliated with the device 514 is configured to generate the hash value for the configuration data of the device. At step 1004, a server 509 is affiliated with the same network 511 as that of the device 514 or is affiliated with a second network (512, 513) to receive the generated hash value from the device. In an embodiment, the device 514 is enabled to generate the hash value upon receiving an input command from the server 509. In another embodiment, the device 514 is configured to periodically generate the hash value for the configuration data in order to periodically determine the security compliance.

Further, at step 1006, the server 509 is enabled to compare the hash value received from the device or the processing circuit 802 against a pre-determined hash value. In an embodiment, the pre-determined hash value corresponds to the same default configuration data, i.e., if the configuration data is password then the generated hash value corresponds to present password of the device and the pre-determined hash value corresponds to default password. In some embodiments, the default configuration data may represent the configuration data utilized by the manufacturer or service provider at the time of manufacturing or installation.

In some embodiments, the configuration data is selected from the group consisting of status of Secure Socket Shell (SSH), status of Telnet, port data, password, and firmware version. In still another embodiment, the configuration data may represent any configuration of the device which is meant to be utilized at the time of installation or is a modifiable parameter which and is desired to be changed by the user post installation or periodically.

At step 1008, the server 509, is enabled to determine the device as security non-compliant when the received hash value is equal to the pre-determined hash value indicating that the default configuration data is unchanged. Alternatively, at step 1010, the server 509 is enabled to determine the device as security compliant when the received hash value is not equal to the pre-determined hash value representing default configuration data.

In some embodiments, the steps performed by the server 509 further includes: determining, the configuration data for which the hash value is received; extracting, the pre-determined hash value corresponding to the determined configuration data of the device from a repository, wherein the repository is configured to store pre-determined hash values corresponding to multiple configuration data for each device on the network; and utilizing, the pre-determined hash value extracted from the repository for comparison with the hash value received from the processing circuit.

In accordance with an embodiment of the present disclosure, the server 509 may correspond to the server of the Building Management System (BMS) or Building Automation System (BAS).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for verifying security compliance of one or more devices on a network, said method comprising:
   receiving, by a server, a generated hash value from a processing circuit for configuration data of a device of the one or more devices on the network;
   comparing, by the server, the hash value received from the processing circuit with a pre-determined hash value for said configuration data of said device, wherein the pre-determined hash value is based on a default password of said device, wherein the default password is set at the time of manufacture or installation of the device, wherein said device is determined as security non-compliant when the received hash value is equal to the pre-determined hash value, and said device is determined as security compliant when the received hash value is different than the pre-determined hash value;
   in response to determining that the device is security non-compliant:
      generating, by the server, a flag signal reporting the security non-compliance of the device;
      providing an alert that the device is security non-compliant; and
      displaying details of the device being security non-compliant, the details including the alert and an action to be taken;
   in response to determining that the device is security compliant:
      periodically comparing a new hash value for the configuration data of the device against an updated pre-determined hash value to determine whether the device remains security compliant; and
   generating a report of a security compliance status of the one or more devices on the network.

2. The method of claim 1, wherein generating the hash value further comprises:
   analyzing, the configuration data by employing hash function; and
   determining, the hash value based on the analysis of the configuration data.

3. The method of claim 1, wherein comparing the hash values further comprises:
   determining, the configuration data for which the hash value is received;

extracting, the pre-determined hash value corresponding to the determined configuration data of said device from a repository, wherein said repository is configured to store pre-determined hash values corresponding to multiple configuration data for each device on said network; and utilizing, the pre-determined hash value extracted from the repository for comparison with the hash value received from the processing circuit.

4. The method of claim 1, further comprising:

generating, a logic high signal when the received hash value is equal to the pre-determined hash value indicating security non-compliance of said device; and reporting, security non-compliance of the device upon generation of the logic high signal.

5. The method of claim 1, wherein said configuration data is a password, and the generated hash value is a present password.

6. The method of claim 1, further comprising:

transmitting, the generated hash value to the server as a message, wherein said generated hash value is part of said message.

7. The method of claim 1, wherein said configuration data comprises at least one of port data, status of Secure Socket Shell (SSH), status of Telnet, password, and firmware version.

8. A method for verifying security compliance of a device on a network, the method comprising:

receiving, by a configuration compliance evaluator, a generated hash value from a processing circuit for configuration data of said device;

comparing, by the configuration compliance evaluator, the hash value received from the processing circuit with a pre-determined hash value for default authentication credentials of said device, wherein the default authentication credentials include a default password of said device, wherein the default password is set at the time of manufacture or installation of the device, wherein said device is determined as security non-compliant when the received hash value is equal to the pre-determined hash value, and said device is determined as security compliant when the received hash value is different than the pre-determined hash value;

in response to determining that the device is security non-compliant:
  generating, by the configuration compliance evaluator, a flag signal reporting the security non-compliance of the device;
  providing an alert that the device is security non-compliant; and
  displaying details of the device being security non-compliant, the details including the alert and an action to be taken;

in response to determining that the device is security compliant:
  periodically comparing a new hash value for the configuration data of the device against an updated pre-determined hash value to determine whether the device remains security compliant; and generating a report of a security compliance status of one or more devices on the network.

9. The method of claim 8, further comprising:

generating, by the configuration compliance evaluator, a logic high signal when the received hash value is equal to the pre-determined hash value indicating security non-compliance of said device; and reporting, by the configuration compliance evaluator, security non-compliance of the device upon generation of the logic high signal.

10. The method of claim 8, further comprising:

extracting, by the configuration compliance evaluator, the pre-determined hash value for said device from a repository, wherein said repository is configured to store pre-determined hash values corresponding to a plurality of devices on said network; and utilizing, by the configuration compliance evaluator, the pre-determined hash value extracted from the repository for comparison with the hash value received from the processing circuit.

11. The method of claim 8, further comprising:

generating, by the configuration compliance evaluator, a logic low signal when the received hash value and the pre-determined hash value are different;

updating, by the configuration compliance evaluator, the pre-determined hash value with the received hash value in said repository upon generation of the logic low signal; and periodically compare, by the configuration compliance evaluator, the received hash value of authentication credentials and said updated pre-determined hash value for said device to determine security non-compliance of said device.

12. A system for verifying security compliance of a device on a network, said system comprising:

a server configured to receive a received hash value generated by employing a hash function on configuration data of said device, the server having:
  a repository configured to store a pre-determined hash value for the configuration data of said device; and
  one or more processors configured to:
    compare the received hash value with the pre-determined hash value, wherein the pre-determined hash value is based on a default password of said device, wherein the default password is set at the time of manufacture or installation of the device, wherein said device is determined as security non-compliant when the received hash value is equal to the pre-determined hash value, and said device is determined as security compliant when the received hash value is different than the pre-determined hash value;
    in response to determining that the device is security non-compliant:
      generate a flag signal reporting security non-compliance of the device;
      provide an alert that the device is security non-compliant; and
      display details of the device being security non-compliant, the details including the alert and an action to be taken;
    in response to determining that the device is security compliant:
      periodically compare a new hash value for the configuration data of the device against an updated pre-determined hash value to determine whether the device remains security compliant; and
    generate a report of a security compliance status of one or more devices on the network.

13. The system of claim 12, wherein the one or more processors are further configured to:

determine the configuration data for the received hash value and extract the pre-determined hash value corresponding to the determined configuration data from the repository; and compare the received hash value with the pre-determined hash value extracted from the repository, and generate a logic high signal indicating security non-compliance of said device, when the received hash value is equal to the pre-determined hash value.

14. The system of claim 12, wherein the one or more processors are further configured to:

generate a logic low signal when the received hash value and the pre-determined hash value are different;

update the pre-determined hash value with the received hash value in said repository; and periodically compare the received hash value of configuration data and said updated pre-determined hash value for said device to determine security compliance of said device.

15. The system of claim 13, wherein the one or more processors are further configured to generate a flag signal reporting security non-compliance of said device upon generation of the logic high signal.

16. The system of claim 12, wherein said configuration data comprises a present password.

17. The system of claim 12, further comprising a processing circuit configured to transmit the received hash value to the server as part of a heartbeat message, and wherein the server is configured to receive the received hash value from the heartbeat message.

18. The system of claim 12, wherein said pre-determined hash value is associated with default configuration data applied during manufacturing or installation.

19. The system of claim 12, further comprising a processing circuit having:

a memory configured to store the hash function; and a processor configured to:

analyze the configuration data by employing the hash function; and determine the received hash value for the analyzed configuration data.

20. The system of claim 12, wherein said server shares a same or different network with the device being verified for security compliance.

* * * * *